United States Patent [19]

LaRochelle

[11] 4,102,941

[45] Jul. 25, 1978

[54] METHOD FOR MAKING SILARYLENESILOXANE-POLYDIORGANOSILOXANE BLOCK POLYMERS

[75] Inventor: Ronald W. LaRochelle, Schenectady, N.Y.

[73] Assignee: General Electric Company, Schenectady, N.Y.

[21] Appl. No.: 740,779

[22] Filed: Nov. 11, 1976

[51] Int. Cl.² ............................................. C08L 83/10
[52] U.S. Cl. ...................................... 260/825; 528/11
[58] Field of Search ..................... 260/46.5 P, 46.5 G, 260/825

[56] References Cited

U.S. PATENT DOCUMENTS

| | | | |
|---|---|---|---|
| 3,160,601 | 12/1964 | Hyde | 260/46.5 G |
| 3,202,634 | 8/1965 | Merker | 260/46.5 P |
| 3,959,403 | 5/1976 | LaRochelle | 260/46.5 P |

Primary Examiner—Melvyn I. Marquis
Attorney, Agent, or Firm—William A. Teoli; Joseph T. Cohen; Charles T. Watts

[57] ABSTRACT

A method is provided for making silarylenesiloxane-polydiorganosiloxane block polymers, based on the reaction between a silarylenesilanediol and a silanol terminated polydiorganosiloxane in the presence of a condensation catalyst in the form of an amine salt of certain carboxylic acids. A carbonyl containing organic compound, such as phthalic anhydride, is employed prior to a subsequent devolatilization step to facilitate the removal of amine-carboxylic acid catalyst residues.

6 Claims, No Drawings

METHOD FOR MAKING SILARYLENESILOXANE-POLYDIORGANOSILOXANE BLOCK POLYMERS

The present invention relates to a method for making silarylenesiloxane-polydiorganosiloxane block polymer, based on the intercondensation of silarylenesilanediol and silanol terminated polydiorganosiloxane. More particularly, the present invention relates to the use of a carbonyl compound, such as an organic aldehyde, organic acid anhydride, etc., organic ketone, to facilitate the removal of residual amine-carboxylic acid condensation catalyst from silarylenesiloxane-polydiorganosiloxane block polymer which can interfere with the thermal stability of the block polymer.

Prior to the present invention, as shown by Merker U.S. Pat. No. 3,202,634, silarylenesiloxane-polydiorganosiloxane block polymers consisting essentially of silarylenesiloxy blocks of the formula,

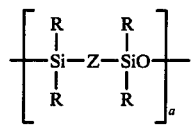

chemically combined with polydiorganosiloxane blocks,

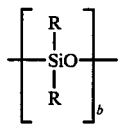

where R is a monovalent organic radical, Z is a divalent aromatic organic radical, $a$ has an average value greater than 3, and $b$ has an average value greater than 10, was prepared by effecting the intercondensation of a silanol terminated polydiorganosiloxane of the formula,

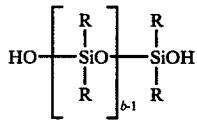

with a silarylenesilanediol,

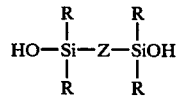

using an amine-carboxylic acid condensation catalyst. It was found that amine-carboxylic acid catalyst residues adversely affect the heat stability of the resulting silicone block polymer. A procedure which was employed to effect the removal of such amine-carboxylic acid catalyst residues from the block polymer was by pouring the block polymer solution into methanol to effect block polymer precipitation. Prior to the precipitation step, the viscous block polymer solution was also further diluted with additional organic solvent, such as benzene, toluene, chloroform or methylene chloride. As a result, large volumes of solvent were necessary which were difficult to salvage. The precipitation procedure therefore was economically unattractive.

The present invention is based on the discovery that block polymers consisting essentially of units of formula (1) chemically combined with units of formula (2) can be made substantially free of amine carboxylic-acid residues by the intercondensation of silanol fluid of formula (3) with silarylenesilanediol of formula (4) without the need of a precipitation step, or the use of large volumes of organic solvent, by adding water to the mixture after the initial condensation reaction and azeotroping the water therefrom, followed by the use of an organic carbonyl compound or precursor thereof, defined more particularly below, and thereafter devolatilizing the mixture to effect the stripping of remaining catalyst residues from the block polymer.

There is provided by the present invention a method for making silarylenesiloxane-polydiorganosiloxane block polymer consisting essentially of chemically combined units of formulas (1) and (2), and referred to hereinafter as "block polymer", which comprises, (1) refluxing a mixture comprising silarylene silanediol of formula (4) and a silanol terminated polydiorganosiloxane of formula (3) in an inert organic solvent in the presence of an effective amount of an amine salt of a carboxylic acid, selected from the class consisting of formic, acetic and propionic, (2) additional 0.01 to 1 part of water, per part of mixture to the mixture or (1), (3) azeotroping the mixture of (2) until it is substantially free of water, (4) adding an effective amount of an organic carbonyl compound, or precursor thereof, to the mixture of (3) and (4) devolatilizing the mixture of (4) at temperatures up to 175° C.

Included by the monovalent organic radicals shown by R of formula 1-4 are, for example, $C_{(1-8)}$ alkyl radicals, such as methyl, ethyl, propyl, butyl, pentyl, etc.; aryl radicals, such as phenyl, naphthyl; alkaryl radicals, such as tolyl, xylyl; unsaturated aliphatic radicals such as vinyl, allyl, propenyl; and halogenated derivatives thereof, such as chlorophenyl, 3,3,3-tri-fluoropropyl, etc. Included by the divalent aromatic radicals shown by Z of formulas 1 and 3 are are, for example, divalent aromatic hydrocarbon radicals, such as phenylene, tolylene, xylene, naphthylene, 4,4'-biphenylene 4,4'-diphenylene ether, etc.; halogenated divalent aromatic hydrocarbon radicals, such as chlorophenylene, bromonaphthylene, etc. In formulas 1-4, where R and Z respectively can represent more than 1 radical, these radicals can be all the same or can be different as previously defined.

Included in the organic carbonyl compounds which can be used in the practice of the present invention to minimize the effect of amine-carboxylic acid catalyst residues on the heat stability of the block polymers made in accordance with the method of the present invention are, for example, cyclic organic anhydrides, such as phthalic anhydride, maleic anhydride, succinic anhydride, polyanhydrides, such as

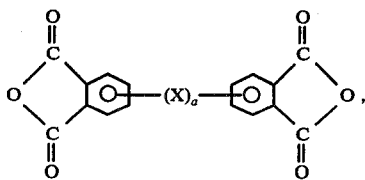

where a can be 0 or 1, and X is selected from

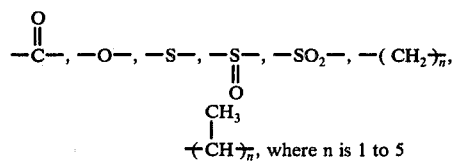

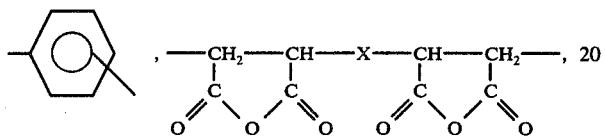

where X is as previous defined, etc.; anhydride containing polymers consisting essentially of units such as

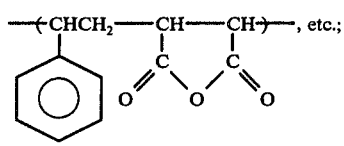

organic aldehydes and ketones, such as benzaldehyde and other aromatic aldehydes, caproaldehyde and other aliphatic aldehydes; acetophenone, propiophenone, and other aliphatic-aromatic ketones, benzophenone and other aromatic ketone, cyclohexanone, heptanone and other cycloaliphatic ketones; polyketones, such as benzil

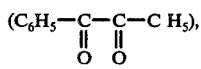

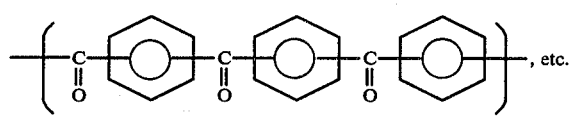

In addition to the above described carbonyl compounds, precursors of such carbonyl compounds also can be utilized as the organic carbonyl compound which can be added to the reaction mixture, such as polycarboxylic acids, such as phthalic acid, maleic acid, succinic acid, etc.; acetals and ketals, such as benzaldehyde diethyl ketal, acetophenone diethylene ketal,

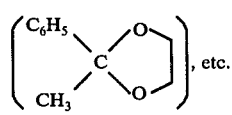

Included in the silarylenesilanediols of formula (4) are compounds such as

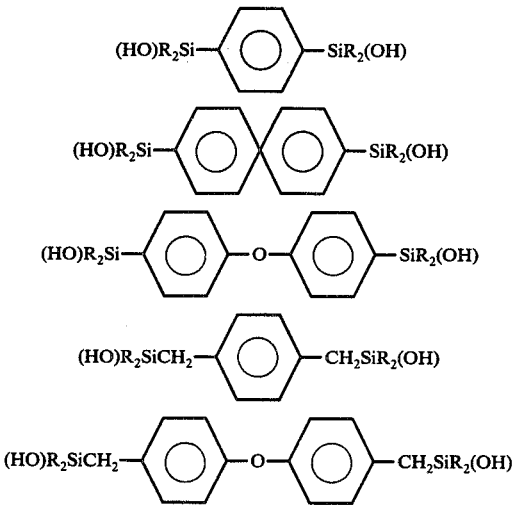

Included by the silanol terminated polydiorganosiloxane of formula (3) are polymers where b of formulas 2 and 4 is an integer having a value of from 5–10,000 inclusive, and preferably, an average of from 10–1,000 inclusive.

In the practice of the invention the block polymer can be made by effecting reaction between the silarylenesilanediol, and the silanol terminated polydiorganosiloxane in the presence of an inert organic solvent and a non-rearranging catalyst, such as an amine-carboxylic acid. To facilitate the removal of the amine-carboxylic acid catalyst residues from the mixture, water can be added thereto. The water and the organic solvent can then be azeotroped from the mixture. There can then be added to the mixture, the organic carbonyl reactant followed by stripping the mixture of volatiles.

The intercondensation reaction can be conducted at a temperature in the range of from 25° to 150° C and preferably from 80° to 120° C. Reaction times can vary widely depending upon the nature of the reactants, the temperature of the reaction, such factors as degree of agitation etc. Generally, however, the reaction can be completed anywhere from 4 hours or less to as long as 24 hours or more.

The amine-carboxylic acid catalyst can be formed in situ utilizing substantially equal moler amounts of amine and carboxylic acid. However, excesses of either components can be utilized without adverse results. Preferably, organic primary amines can be used, such as $C_{(1-8)}$ alkyl amines, for example, methyl, ethyl, propyl, butyl, pentyl, hexyl amines, etc. Carboxylic acids which can be used are preferably formic, acetic, propionic, etc. If desired, preformed amine-carboxylic acid condensation catalysts can be used, such as a variety shown in Hyde, U.S. Pat. No. 3,160,601, Merker U.S. Pat. No. 3,202,634 and Fork U.S. Pat. No. 3,032,530.

Experience has shown that about 0.01 to 5% by weight of the amine-carboxylic acid catalyst will provide for effective results.

Organic solvents which can be used in the practice of the invention are, for example, any inert organic solvent including non-polar organic solvents, such as benzene, toluene, xylene, ethylbenzene. Other inert organic solvents which can be used are polar aprotic organic solvents, such as chloroform, chlorobenzene, chlorotoluene, etc.

The amount of water that can be added to the mixture after the initial intercondensation reaction can vary widely, such as from 0.01 parts to 1 part of water per part of mixture. It has been found that effective results can be achieved if from 0.1% to 1% by weight of carbonyl compound, based on the weight of reaction mixture is used in the practice of the invention.

The final stripping or devolatilization of the block polymer after the carbonyl compound has been added can be achieved after 0.5 to 8.0 hours, at temperatures in the range of from 150° to 175° C.

In order that those skilled in the art will be better able to practice the invention, the following example is given by way of illustration and not by way of limitation. All parts are by weight.

EXAMPLE 1.

A mixture of 220 parts of p-bis(dimethylhydroxysilyl) benzene, 300 parts of a 60 centistoke silanol terminated polydimethylsiloxane fluid, 250 parts of toluene, 4 parts of tert-butyl amine, and 5 parts of formic acid was refluxed for 6 hours. There was added to the resulting mixture, 100 parts of water. The mixture was thoroughly stirred and then azeotroped dry. There was added 8 parts of phthalic anhydride to the resulting mixture and the mixture was refluxed for 30 minutes. The resulting mixture was then devolatilized over a 12 hour period at a temperature of 115° C at 30 Torr. A stiff white gum was obtained. Based on method of preparation, the resulting white gum was a block polymer consisting essentially of diphenylenesiloxane units chemically combined with blocks of polydimethylsiloxy units.

The above procedure was repeated except that the block polymer was recovered without the use of a carbonyl reactant, such as phthalic anhydride in the reaction mixture. In another reaction free of carbonyl reactant, block polymer was recovered by also precipitating it from a reaction mixture by direct addition of methanol to the reaction mixture. Additional block polymer was recovered from reaction mixtures containing different amine-carboxylic acids and carbonyl reactants other than phthalic anhydride. The block polymer was then evaluated for thermal stability in accordance with thermal gravemitric analysis (TGA) in air and under a nitrogen atmosphere over a period of 1.5 hours to determine the temperature required to effect the loss of 10% by weight of the block polymer. The following results were obtained where the catalyst was prepared in situ in the reaction mixture by employing substantially equal molar amounts of the acid and the amine "$t$" is tert, "$o$" is ortho and "$n$" is normal:

| Carbonyl Reactant | In Situ- Catalyst | T(° C) for 10% WT Loss | |
|---|---|---|---|
| | | Air | $N_2$ |
| None | $HCO_2H/t\text{-}C_4H_9NH_2$ | 340 | 345 |
| None + | | | |
| Precipitated Maleic Anhydride | $HCO_2H/t\text{-}C_4H_9NH_2$ | 435 | 435 |
| Phthalic Anhydride | $HCO_2H/t\text{-}C_4H_9NH_2$ | 395 | 375 |
| Succinic Anhydride | $HCO_2H/t\text{-}C_4H_9NH_2$ | 430 | 425 |
| Benzil | $HCO_2H/n\text{-}C_6H_{13}NH_2$ | 390 | 370 |
| Benzoaldehyde | $HCO_2H/o\text{-}C_6H_4(NH_2)_2$ | 405 | 405 |
| | $HCO_2H/n\text{-}C_6H_{13}NH_2$ | 390 | 395 |

The above results show that improved thermal stability can be achieved with the block polymer of the present invention if it is precipitated from solution as generally practiced in accordance with the prior art, or a carbonyl additive is employed in the reaction mixture in accordance with the practice of the present invention. In instances where precipitation was not employed, or the carbonyl compound was not utilized in the reaction mixture, the thermal stability of the block polymer was adversely affected.

Although the above example is limited to only a few of the very many variables which can be employed in the practice of the method of the present invention, it should be understood that the present invention is directed to the use of a much broader class of organic carbonyl compounds and amine-carboxylic acid catalysts as well as silarylenesilanediols and silanol terminated polydiorganosiloxanes as shown in the description preceding these examples.

What I claim as new and desire to secure by Letters Patent of the U.S. is:

1. A method for making silarylenesiloxane-polydiorsanosiloxane block polymer which comprises
   (1) refluxing a mixture comprising a silarylenesilanediol, a silanol terminated polydiorganosiloxane, and an inert organic solvent and an effective amount of an amine-carboxylic acid catalyst,
   (2) adding from 0.01% to 100% by weight of water, based on the weight of the mixture,
   (3) heating the resulting mixture of (2) to effect the separation of an azeotrope of water and the substantially inert organic solvent until the mixture is substantilaly free of water,
   (4) adding an amount of an organic carbonyl compound to the mixture of (3), which is effective to facilitate the removal of amine-carboxylic acid catalyst residues, and
   (5) devolatilizing the mixture of (4) at a temperature of up to 175° C.

2. A method in accordance with claim 1, where the silanol terminated polydiorganosiloxane is a silanol terminated polydimethylsiloxane.

3. A method in accordance with claim 1, where the silarylenesilanediol is a silphenylenesilanediol.

4. A method in accordance with claim 1, where the amine-carboxylic acid catalyst is t-butylamine formate.

5. A method in accordance with claim 1, where the organic carbonyl compound is phthalic anhydride.

6. A method in accordance with claim 1, where the inert organic solvent is toluene.

* * * * *